(12) United States Patent
Kon et al.

(10) Patent No.: US 12,091,062 B2
(45) Date of Patent: Sep. 17, 2024

(54) RAILROAD CAR

(71) Applicant: Hitachi, Ltd., Tokyo (JP)

(72) Inventors: Misaki Kon, Tokyo (JP); Tomoo Hayashi, Tokyo (JP); Takahisa Yamamoto, Tokyo (JP); Ryota Fukuhara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 17/763,570

(22) PCT Filed: Jul. 14, 2020

(86) PCT No.: PCT/JP2020/027344
§ 371 (c)(1),
(2) Date: Mar. 24, 2022

(87) PCT Pub. No.: WO2022/013937
PCT Pub. Date: Jan. 20, 2022

(65) Prior Publication Data
US 2023/0159065 A1 May 25, 2023

(51) Int. Cl.
*B61D 27/00* (2006.01)
(52) U.S. Cl.
CPC .............................. *B61D 27/0018* (2013.01)
(58) Field of Classification Search
CPC .................................................. B61D 27/0009
See application file for complete search history.

(56) References Cited

U.S. PATENT DOCUMENTS

| | | | |
|---|---|---|---|
| 238,777 A * | 3/1881 | Fox et al. | B60H 3/06 454/110 |
| 2011/0053484 A1 | 3/2011 | Yuasa | |

(Continued)

FOREIGN PATENT DOCUMENTS

| | | |
|---|---|---|
| CN | 206141559 U | 5/2017 |
| CN | 107270499 A | 10/2017 |

(Continued)

OTHER PUBLICATIONS

Yuasa, WO-2009144808-A1 and translation (Year: 2009).*

(Continued)

*Primary Examiner* — Steven S Anderson, II
(74) *Attorney, Agent, or Firm* — Crowell & Moring LLP

(57) ABSTRACT

To provide a railroad vehicle 10 capable of controlling a private room temperature and a guest room temperature with a simple configuration without increasing the number of manufacturing steps and without requiring complicated control while using a common air conditioner in view of the fact that the number of passengers of a private room and the number of passengers of a general guest room are largely different from each other in many cases, which causes a change in indoor temperature. A railroad vehicle 10 includes a private room 12, a guest room 11, an air conditioner 20, and a main duct 30 for supplying conditioned air conditioned by the air conditioner 20 to the guest room 11, a branch duct 40 for connecting the main duct 30 to the private room 12 is provided in order to supply the conditioned air, and the branch duct 40 includes an introduced air port 42 for introducing the air of the guest room 11 to the branch duct 40 in accordance with a difference between the pressure in the guest room 11 and the pressure in the branch duct 40 or the private room 12.

5 Claims, 10 Drawing Sheets

(56) References Cited

U.S. PATENT DOCUMENTS

| | | | |
|---|---|---|---|
| 2019/0111949 A1 | 4/2019 | Ochiai | |
| 2019/0315378 A1 | 10/2019 | Onitake et al. | |
| 2020/0189358 A1 | 6/2020 | Tashiro et al. | |

FOREIGN PATENT DOCUMENTS

| | | | | |
|---|---|---|---|---|
| CN | 109311487 A | 2/2019 | | |
| CN | 109311490 A | 2/2019 | | |
| EP | 0 678 434 A1 | 10/1995 | | |
| EP | 3 202 634 A1 | 8/2017 | | |
| JP | 2004-239525 A | 8/2004 | | |
| JP | 2006-298028 A | 11/2006 | | |
| JP | 2017-13612 A | 1/2017 | | |
| JP | 2019-189211 A | 10/2019 | | |
| TW | 201325961 A1 | 7/2013 | | |
| WO | WO 2009/144808 A | 12/2009 | | |
| WO | WO-2009144808 A1 * | 12/2009 | ......... | B60H 1/00371 |
| WO | WO 2016/051580 A1 | 4/2016 | | |

OTHER PUBLICATIONS

International Search Report (PCT/ISA/210) issued in PCT Application No. PCT/JP2020/027344 dated Sep. 29, 2020 with English translation (five (5) pages).

Japanese-language Written Opinion (PCT/ISA/237) issued in PCT Application No. PCT/JP2020/027344 dated Sep. 29, 2020 (three (3) pages).

Taiwanese-language Office Action issued in Taiwanese Application No. 110125510 dated Nov. 29, 2021 (four (4) pages).

* cited by examiner

RAILROAD CAR

TECHNICAL FIELD

The present invention relates to a railroad vehicle.

BACKGROUND ART

A railroad vehicle has a type of vehicle including only a private room in the same vehicle, a type of vehicle including only a general guest room provided with a plurality of seats in the same vehicle, and a type of vehicle including both the private room and the general guest room in the same vehicle. In general, the number of passengers of the private room largely differs from the number of passengers of the general guest room, and thus the heat load removed from the private room by supplying conditioned air generated by an air conditioner largely differs from the heat load removed from the general guest room. Therefore, in order for all the passengers to have a comfortable time, it is necessary to properly design a duct that guides the conditioned air to the private room and the general guest room from the air conditioner installed in the railroad vehicle.

Patent Literature 1 discloses a technique relating to arrangement of an air conditioning duct when a cooking room and a general guest room are provided in the same vehicle. The railroad vehicle disclosed in Patent Literature 1 includes a duct configuration in which even when any one of air conditioners supplying conditioned air to the cooking room and the general guest room that are largely different in heat load breaks down, redundancy at the time of the breakdown of the air conditioner is enhanced so as to maintain a comfortable in-vehicle environment.

CITATION LIST

Patent Literature

[Patent Literature 1] WO2016/051580

SUMMARY OF INVENTION

Technical Problem

A general railroad vehicle includes one air conditioner for each car, and the air conditioner controls the temperature and air volume of conditioned air supplied to the inside of the vehicle so that the in-vehicle temperature observed by a temperature sensor at a representative point inside the railroad vehicle comes close to the target temperature (set temperature).

Here, for example, a case in which a railroad vehicle (one car) with a capacity of 82 people is provided with a private room with a capacity of 2 people and a guest room with a capacity of 80 people and the private room and the guest room are cooled by one air conditioner installed in the railroad vehicle will be examined. When the air conditioner supplies 3 m$^3$/min of conditioned air at a temperature of 17° C. to the private room and supplies 76 m$^3$/min of conditioned air at the same temperature of 17° C. to the guest room on the basis of the temperature observed by a temperature sensor provided in the guest room, since the heat loads of the private room and the guest room are different from each other, the private room temperature is saturated at 21° C. and the guest room temperature is saturated at 25° C. That is, when the air conditioner is controlled on the basis of the guest room temperature, the guest room temperature can be maintained at a predetermined temperature, but the private room temperature becomes much lower than the predetermined temperature, and the temperature environment of the private room tends to deteriorate.

On the contrary, if the flow rate of the conditioned air at the temperature of 17° C. is reduced so that the private room temperature does not become too low, there is a risk that the ventilation amount prescribed per passenger cannot be satisfied, and thus it is difficult to extremely reduce the flow rate of the conditioned air. In addition, if an air conditioner for a private room that detects the temperature of the private room and generates only conditioned air suitable for the private room is newly added, there is a risk that the number of manufacturing steps of the air conditioning system is increased and the air conditioning control becomes complicated.

An object of the present invention is to provide a railroad vehicle that includes a private room and a guest room and can control a private room temperature and a guest room temperature with a simple configuration without increasing the number of manufacturing steps and without requiring complicated control.

Solution to Problem

In order to solve the above-described problems, one of representative railroad vehicles of the present invention is a railroad vehicle including a private room, a guest room, an air conditioner, and a main duct for supplying conditioned air conditioned by the air conditioner to the guest room. In the railroad vehicle, a branch duct for connecting the main duct to the private room is provided in order to supply the conditioned air, and the branch duct includes an introduced air port for introducing the air of the guest room to the branch duct in accordance with a difference between the pressure in the guest room and the pressure in the branch duct or the private room.

Advantageous Effects of Invention

According to the present invention, it is possible to provide a railroad vehicle that includes a private room and a guest room and can control a private room temperature and a guest room temperature with a simple configuration without increasing the number of manufacturing steps and without requiring complicated control.

Problems, configurations, and effects other than those described above will be clarified by the description of the following embodiments.

DESCRIPTION OF EMBODIMENTS

Hereinafter, embodiments of the present invention will be described with reference to the drawings. First, each direction is defined. The longitudinal direction (rail direction) of a railroad vehicle is an x direction, the width direction (sleeper direction) of the railroad vehicle is a y direction, the height direction of the railroad vehicle is a z direction, and hereinafter, they will be simply referred to as the x direction, the y direction, and the z direction in some cases.

First Embodiment

Figure 1:
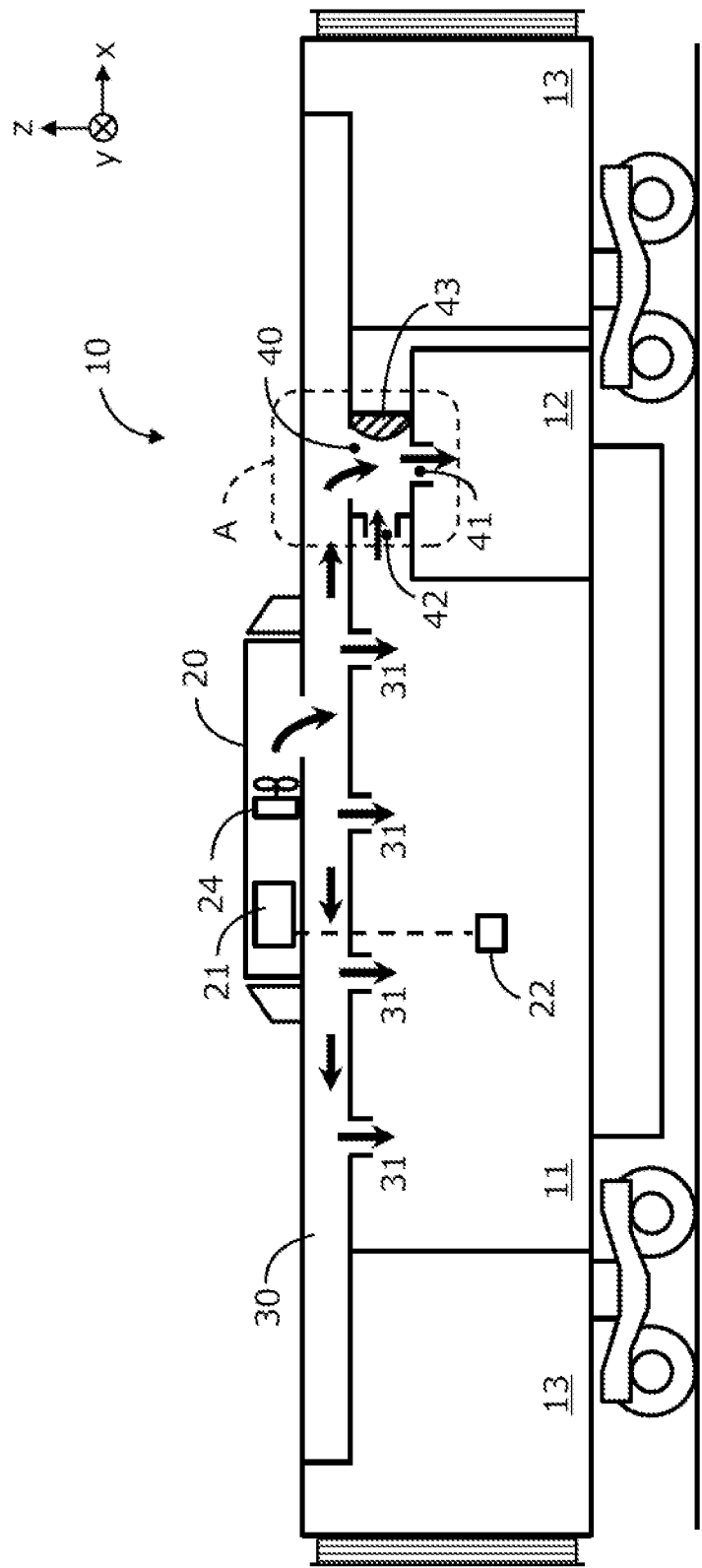
FIG. 1 is an air system diagram of a railroad vehicle including a private room and a guest room.

FIG. 1 is an air system diagram of a railroad vehicle including a private room and a guest room. A railroad vehicle 10 includes a box-like structure in which both ends in the x direction are supported by a pair of carts rolling on a track. An air conditioner 20 is provided on a roof forming an upper part of the structure. The structure includes a general guest room (also simply referred to as a guest room) 11 provided with a plurality of seats, a private room 12 of a small room partitioned for use by a small number of people, and an entrance platform 13 provided with a door used for passengers and the like to get on or off. Hereinafter, the general guest room (for example, with a capacity of 10 or more people) will be written as a guest room 11, and the private room of a small room (for example, with a capacity of less than 10 people) will be written as a private room 12.

A main duct 30 provided along the x direction is arranged at a ceiling part of the structure. The main duct 30 has guest room blow-off ports 31 discretely provided along the x direction and a branch duct 40 communicating with the private room 12.

The air conditioner 20 has a refrigeration cycle system in which a sealed refrigerant circulates and an indoor heat exchanger and an outdoor heat exchanger are arranged, a circulation (indoor) fan 24 installed side by side with the indoor heat exchanger, an outdoor air blower (not shown) installed side by side with the outdoor heat exchanger, and a control device 21 for controlling each of these machines. The guest room 11 is provided with a temperature sensor 22 for measuring the temperature of the guest room 11, and the temperature sensor 22 is connected to the control device 21 controlling the air conditioner 20.

The circulation fan 24 of the air conditioner generates conditioned air by conditioning the temperature and humidity in the process of allowing the circulation air taken into the air conditioner 20 from the inside of the vehicle to pass through the indoor heat exchanger. At this time, there is a case in which the circulation fan 24 mixes a predetermined amount of outside air (fresh air) taken from a fresh air introduction port (not shown) provided in a housing of the air conditioner 20 into the housing with the circulation air to generate the conditioned air.

The conditioned air forcedly fed to the main duct 30 by the circulation fan 24 is supplied from the guest room blow-off ports 31 of the main duct 30 to the guest room 11, and is also supplied to the private room 12 via the branch duct 40.

Figure 2:
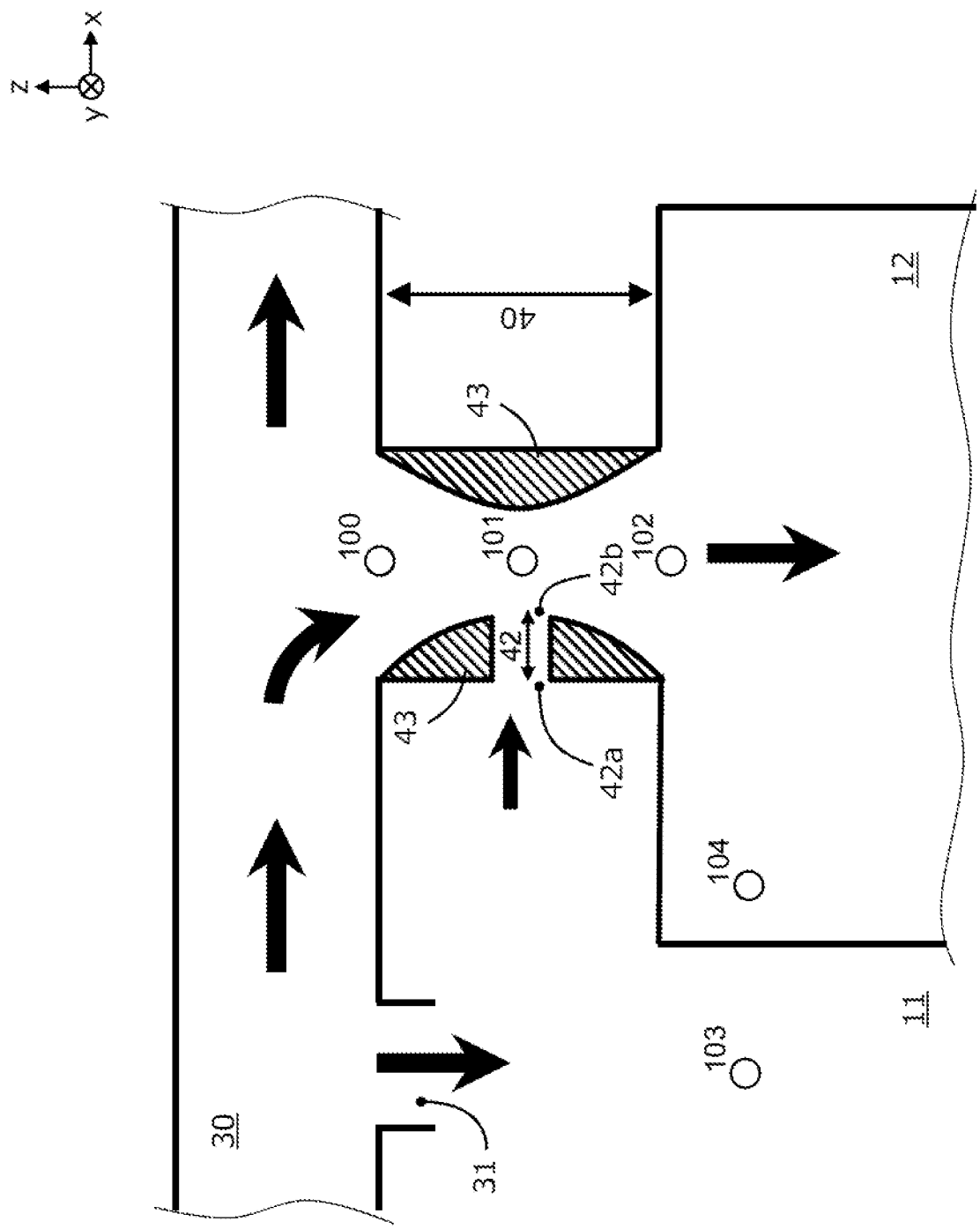
FIG. 2 is an enlarged schematic view of a branch duct (the part A of FIG. 1) branching from a main duct to the private room.

FIG. 2 is an enlarged view of the branch duct (the part A of FIG. 1) branching from the main duct to the private room. The branch duct 40 includes a decompression device (also referred to as a decompression part) 43 having a cylindrical shape whose cross-sectional area in the direction crossing the flow of the conditioned air is gradually reduced and then is gradually enlarged, and a guest room air introduction port 42 provided at the minimum part of the cross-sectional area in the direction crossing the flow of the conditioned air of the decompression device 43.

Figure 3:
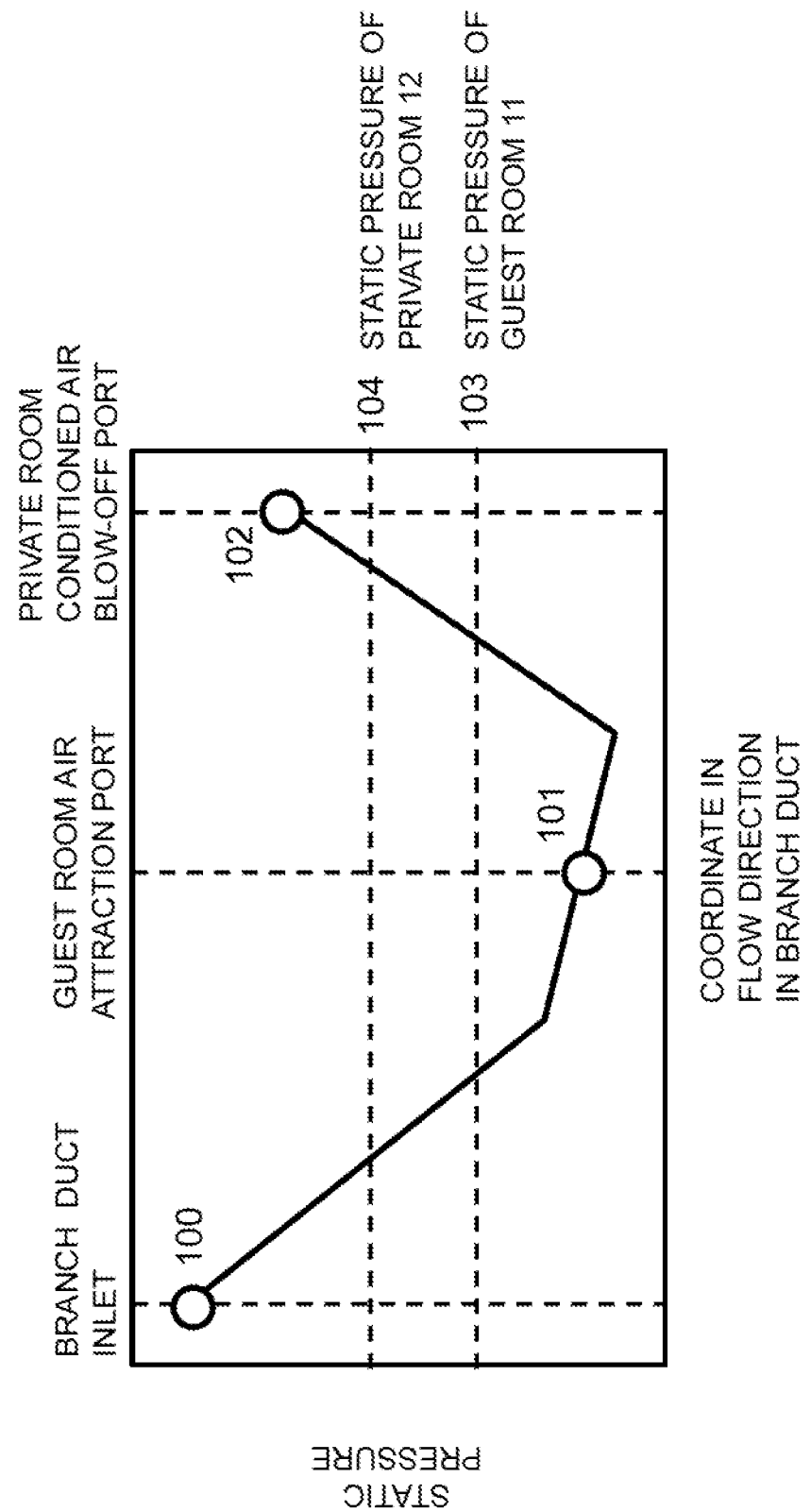
FIG. 3 is a diagram for showing static pressure distribution in the branch duct.

FIG. 3 shows static pressure distribution in the branch duct 40. The static pressure of the conditioned air forcedly fed to the branch duct 40 by the static pressure of a branch duct inlet 100 is reduced because the flow velocity of the conditioned air increases in accordance with a decrease in the cross-sectional area in the process of passing through the decompression device 43. Further, the static pressure of the conditioned air flowing in the branch duct 40 is minimized at a branch duct intermediate part 101 near an outlet 42b of the guest room air introduction port 42. The conditioned air having passed through the outlet 42b of the guest room air introduction port is blown into the private room 12 from a branch duct outlet (private room blow-off port) 102.

As shown in FIG. 3, since the static pressure of the branch duct intermediate part 101 corresponding to the substantially intermediate point of the branch duct 40 is lower than the static pressure 103 of the guest room 11, a part of the air of the guest room 11 passes through the outlet 42b of the guest room air introduction port from an inlet 42a of the guest room air introduction port 42 communicating the guest room 11 with the branch duct 40, is attracted (joined) to the conditioned air flowing in the branch duct 40, and is supplied to the private room 12.

According to the embodiment, the temperature of the conditioned air finally supplied to the private room 12 can be increased by attracting and mixing the air of the guest room 11 with the conditioned air supplied to the private room 12 from the main duct 30. Therefore, even when only the guest room 11 includes the temperature sensor 22 and the control device 21 controls the air conditioner 20 on the basis of the temperature sensor 22, an increase in the difference between the temperature of the private room 12 and the temperature of the guest room 11 can be suppressed. Therefore, in the railroad vehicle including the private room and the guest room, it is possible to provide the railroad vehicle capable of controlling the private room temperature and the guest room temperature with a simple configuration without increasing the number of manufacturing steps and without requiring complicated control.

Second Embodiment

Figure 4:
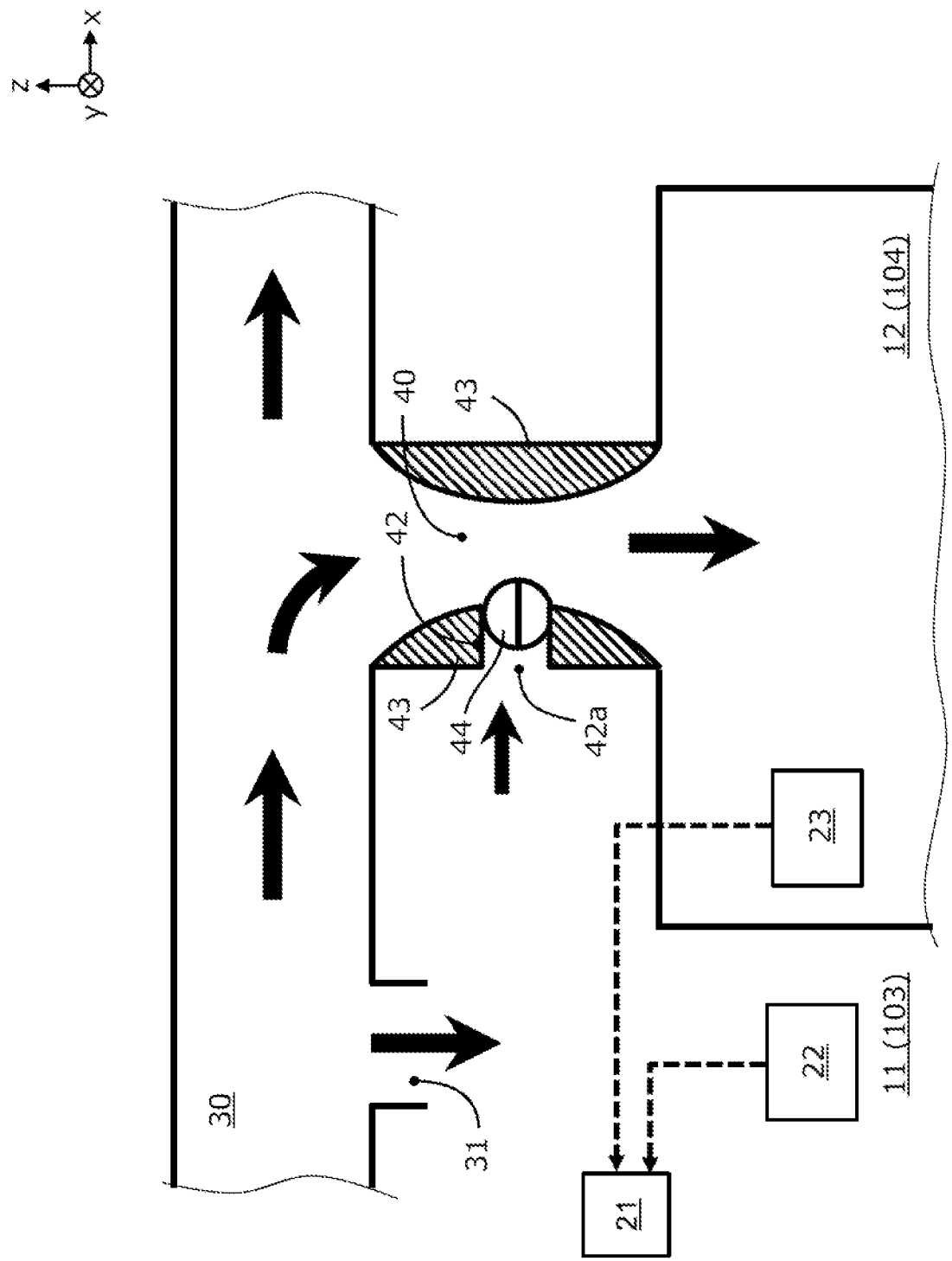
FIG. 4 is a schematic view for showing the branch duct including an air amount adjusting damper at a guest room air introduction port.
Figure 5:
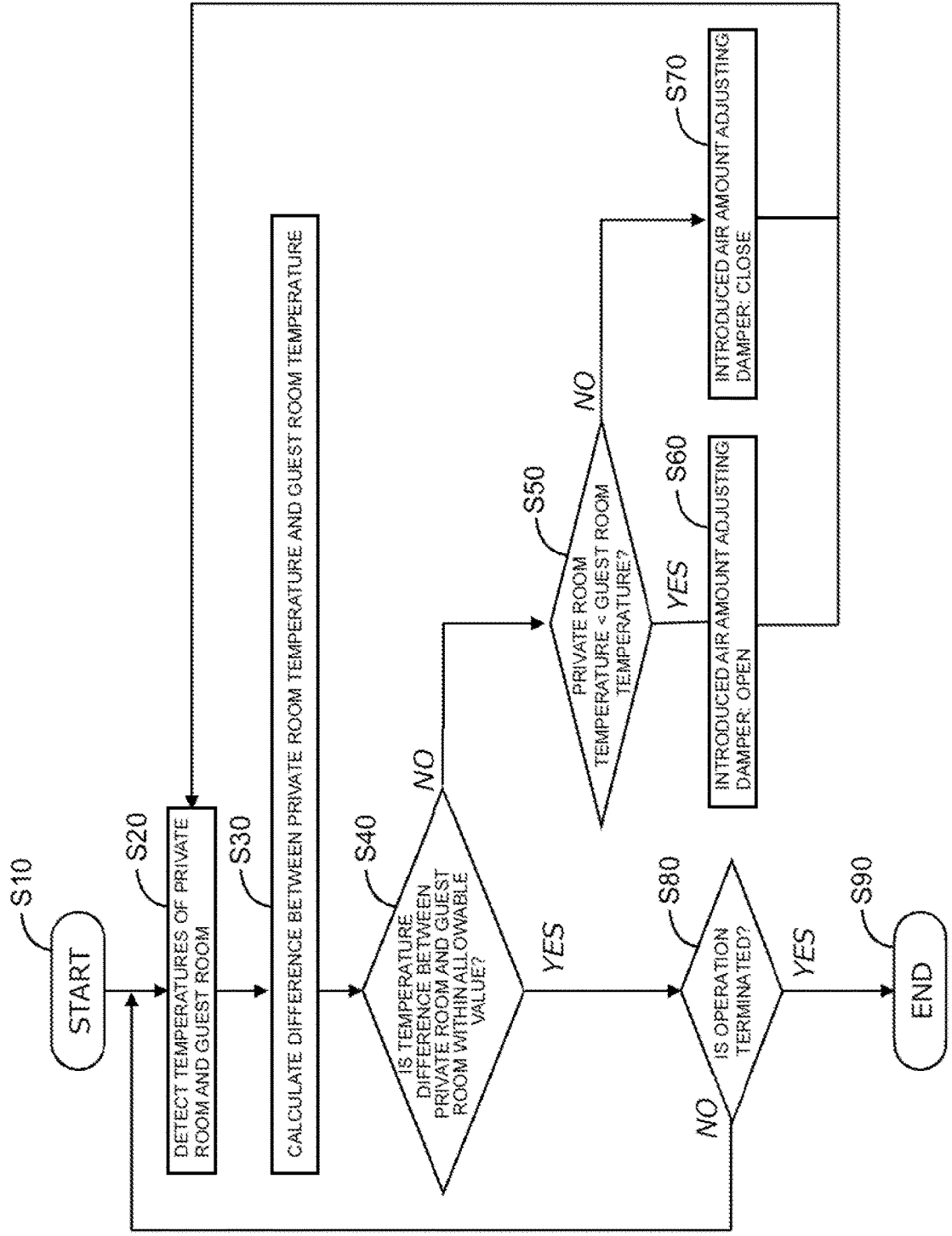
FIG. 5 is a flowchart for controlling the air amount adjusting damper at the guest room air introduction port.

Next, a second embodiment will be described. FIG. 4 shows a branch duct including an air amount adjusting damper at the guest room air introduction port, and FIG. 5 is a flowchart for controlling the air amount adjusting damper at the guest room air introduction port. The description of the common parts with the first embodiment will be omitted, and the configuration and the like characterizing the second embodiment will be mainly described.

In the embodiment, the private room 12 is provided with a temperature sensor 23 for detecting the temperature of the private room 12, and the guest room air introduction port 42 is provided with an introduced air amount adjusting damper 44 opened and closed by a command of the control device 21 connected to the temperature sensor 23. In the introduced air amount adjusting damper 44, the cross section through which the air passes is increased by the open operation and the cross section through which the air passes is decreased by the close operation. A control operation of the introduced air amount adjusting damper 44 will be described with reference to FIG. 4 in accordance with the flowchart shown in FIG. 5.

First, after control is started in Step S10, the temperature sensor 22 detects the temperature of the guest room 11 and the temperature sensor 23 detects the temperature of the private room 12 to transmit the same to the control device 21 in Step S20.

In the subsequent Step S30, the control device 21 calculates a difference between the temperature of the guest room 11 and the temperature of the private room 12 detected in Step S20, and determines whether or not the difference is within the range of allowable values. If the control device 21 determines that the difference between the temperature of the guest room 11 and the temperature of the private room 12 is within the range of the allowable values, the flow proceeds to Step S80. On the other hand, if the control device 21 determines that the difference between the temperature of the guest room 11 and the temperature of the private room 12 is not (out of range) within the range of the allowable values, the flow proceeds to Step S50.

When the flow proceeds to Step S80, the control device 21 determines whether or not the operation is terminated. If it is determined that the operation is terminated, the control device 21 terminates the control operation of the introduced air amount adjusting damper 44 in Step S90. If it is determined that the operation is not terminated, the control device 21 returns the flow to Step S20.

On the other hand, when the flow proceeds to Step S50, the control device 21 further determines whether or not the temperature of the private room 12 is lower than the temperature of the guest room 11. If it is determined that the temperature of the private room 12 is lower than the temperature of the guest room 11, the control device 21 opens the introduced air amount adjusting damper 44 to introduce the air of the guest room 11 into the private room 12 in Step S60. On the other hand, if it is determined that the temperature of the private room 12 is not lower (higher) than the temperature of the guest room 11, the control device 21 closes the introduced air amount adjusting damper 44 to suppress the attraction of the air of the guest room 11 to the private room 12 in Step S70. Thereafter, the control device 21 returns the flow to Step S20.

According to the embodiment, the temperature sensor 23 is added to the private room 12, and the guest room air introduction port 42 connected to the branch duct 40 is provided with the introduced air amount adjusting damper 44 opened and closed by a command of the control device 21 connected to the temperature sensor 23. Therefore, the introduced air amount adjusting damper 44 can be opened and closed to adjust the amount of air of the guest room 11 supplied to the private room 12 by the detected temperature difference between the guest room 11 and the private room 12, and thus an increase in the difference between the temperature of the private room 12 and the temperature of the guest room 11 can be suppressed. Therefore, in the railroad vehicle including the private room and the guest room, it is possible to provide the railroad vehicle capable of controlling the private room temperature and the guest room temperature with a simple configuration without increasing the number of manufacturing steps and without requiring complicated control.

Third Embodiment

Figure 6:
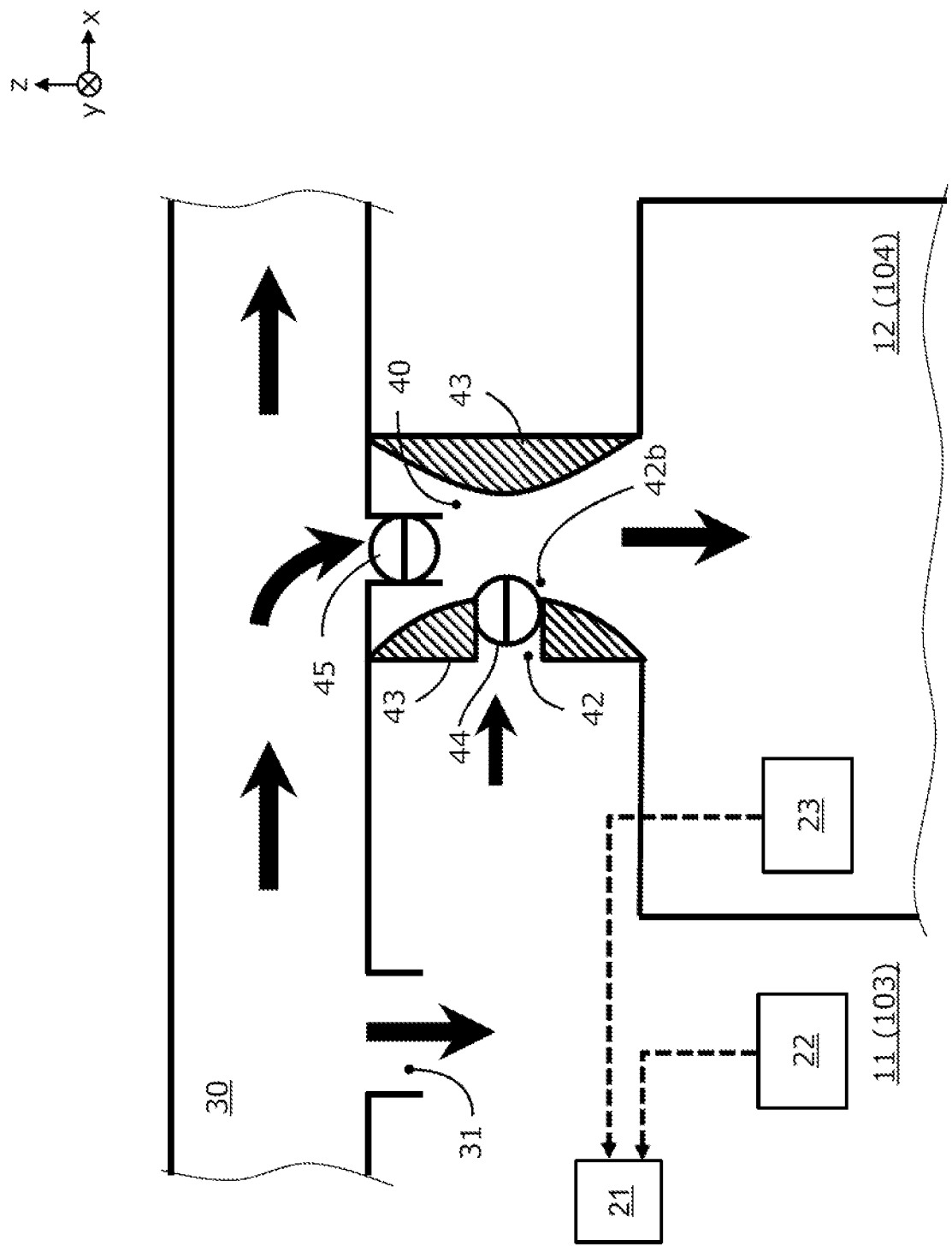
FIG. 6 is a schematic view for showing the branch duct including a conditioned air amount adjusting damper and an introduced air amount adjusting damper.

Next, a third embodiment will be described. FIG. 6 shows a branch duct including a conditioned air amount adjusting damper and an introduced air amount adjusting damper. The description of the common parts with the first embodiment and the second embodiment will be omitted, and the configuration and the like characterizing the third embodiment will be mainly described.

In the embodiment, the private room 12 is provided with the temperature sensor 23 for detecting the temperature of the private room 12, a conditioned air amount adjusting damper 45 is provided at the inlet of the branch duct 40 connecting the main duct 30 to the private room 12, and the guest room air introduction port 42 in the middle of the branch duct 40 is provided with the introduced air amount adjusting damper 44. Although not shown in the drawing, both the introduced air amount adjusting damper 44 and the conditioned air amount adjusting damper 45 open and close according to a command from the control device 21. The control operations of the introduced air amount adjusting damper 44 and the conditioned air amount adjusting damper 45 will be described by using the flowchart shown in FIG. 5.

If it is determined in Step S50 of FIG. 5 that the private room temperature is lower than the guest room temperature, it is desirable to positively introduce the air of the guest room 11 into the private room 12. Here, the amount of air attracted from the guest room 11 to the private room 12 via the guest room air introduction port 42 is determined by the opening degree of the introduced air amount adjusting damper 44 and the degree of pressure drop at the outlet 42b of the guest room air introduction port 42 caused by the amount of conditioned air adjusted by the conditioned air amount adjusting damper 45.

Therefore, when it is determined in Step S50 of FIG. 5 that the private room temperature is slightly lower than the guest room temperature and when it is desired to reduce the amount of air introduced into the private room 12 from the guest room 11, the control device 21 may perform interlocking control so as to reduce the degree of pressure drop by reducing the opening degree of the introduced air amount adjusting damper 44 and the opening degree of the conditioned air amount adjusting damper 45.

In addition, when it is determined in Step S50 of FIG. 5 that the private room temperature is much lower than the guest room temperature and when it is desired to increase the amount of air introduced into the private room 12 from the guest room 11, the control device 21 may perform interlocking control so as to increase the degree of pressure drop by increasing the opening degree of the introduced air amount adjusting damper 44 and the opening degree of the conditioned air amount adjusting damper 45.

In advance, the temperature of the guest room 11, the temperature of the private room 12, the opening degree of the introduced air amount adjusting damper 44, and the opening degree of the conditioned air amount adjusting damper 45 can be tabulated and stored in a memory (not shown). The control device 21 may control the opening degree of the introduced air amount adjusting damper 44 and the opening degree of the conditioned air amount adjusting damper 45 on the basis of this table.

According to the embodiment, the guest room 11 is provided with the temperature sensor 22, the private room 12 is provided with the temperature sensor 23, and the branch duct 40 is provided with the introduced air amount adjusting damper 44 and the conditioned air amount adjusting damper 45 simultaneously opened and closed by a command of the control device 21 to which these temperature sensors are connected. Accordingly, the amount of air of the guest room 11 supplied to the private room 12 can be adjusted by controlling the opening degrees of the introduced air amount adjusting damper 44 and the conditioned air amount adjusting damper 45 by the detected temperature difference between the guest room 11 and the private room 12, so that an increase in the difference between the temperature of the private room 12 and the temperature of the guest room 11 can be suppressed. Therefore, in the railroad vehicle including the private room and the guest room, it is possible to provide the railroad vehicle capable of controlling the private room temperature and the guest room temperature with a mechanical configuration without increasing the number of manufacturing steps by sharing the air conditioner and without requiring complicated control of the air conditioner.

Fourth Embodiment

Figure 7:
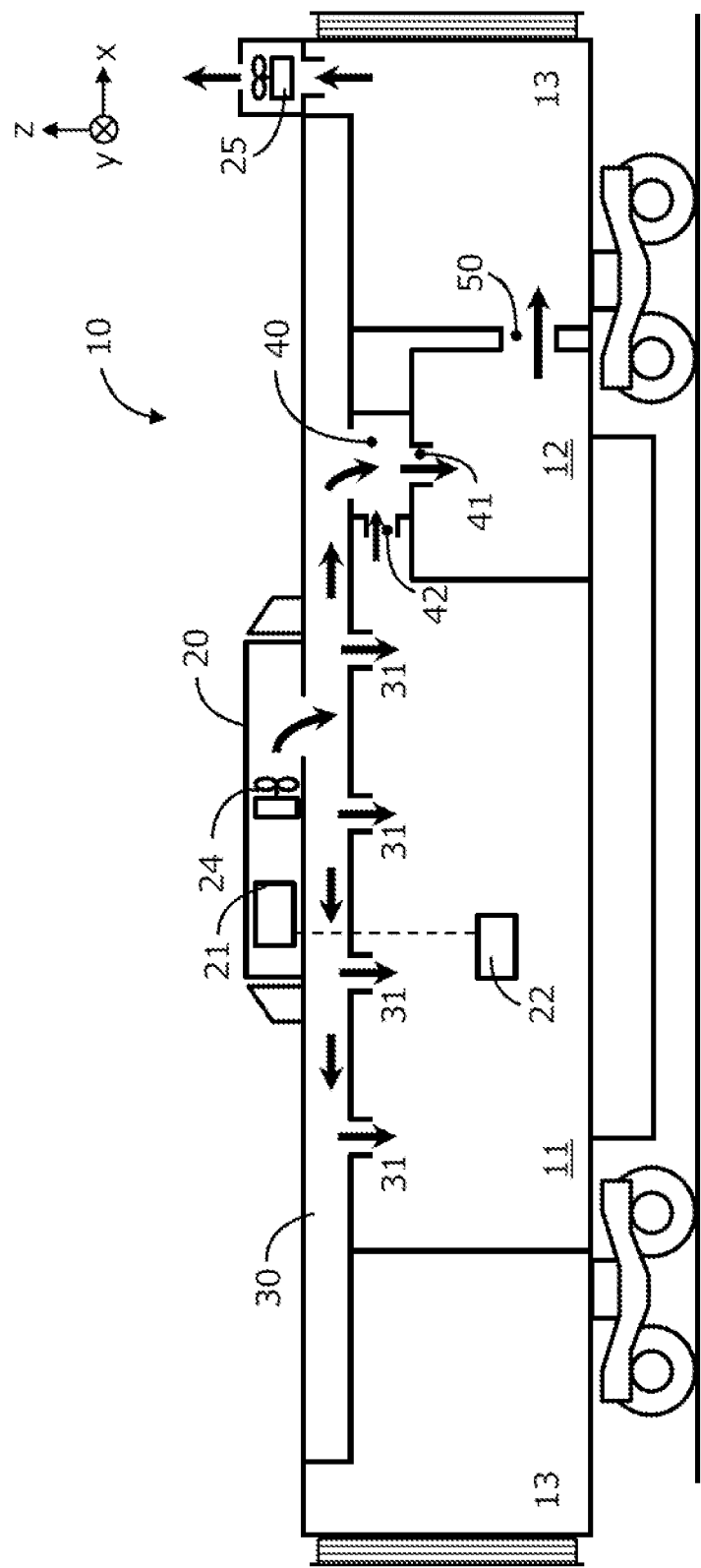
FIG. 7 is an air system diagram of the railroad vehicle including an exhaust fan for exhausting the air inside the vehicle to the outside of the vehicle in the structure.
Figure 8:
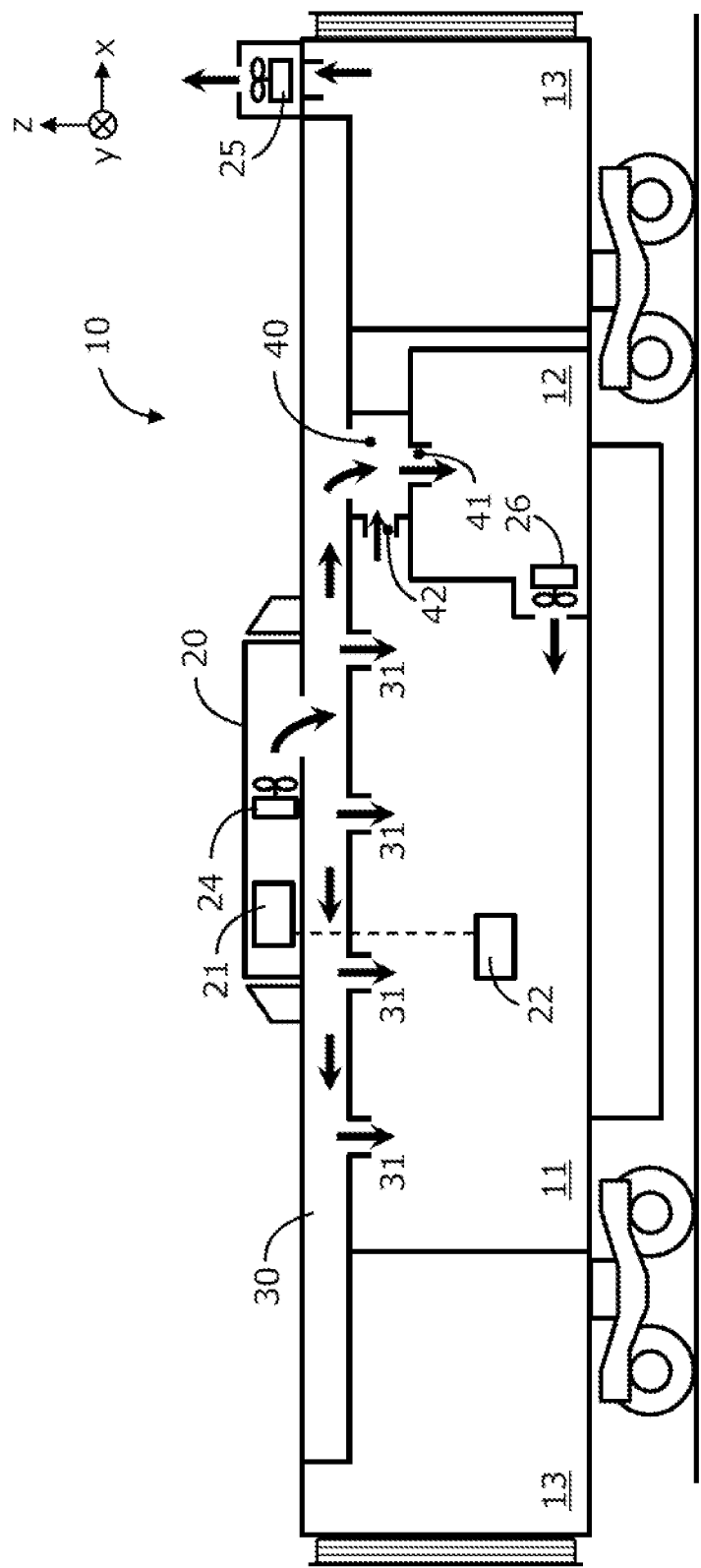
FIG. 8 is an air system diagram of the railroad vehicle including the exhaust fan for exhausting the air of the private room to the guest room in the private room.
Figure 9:
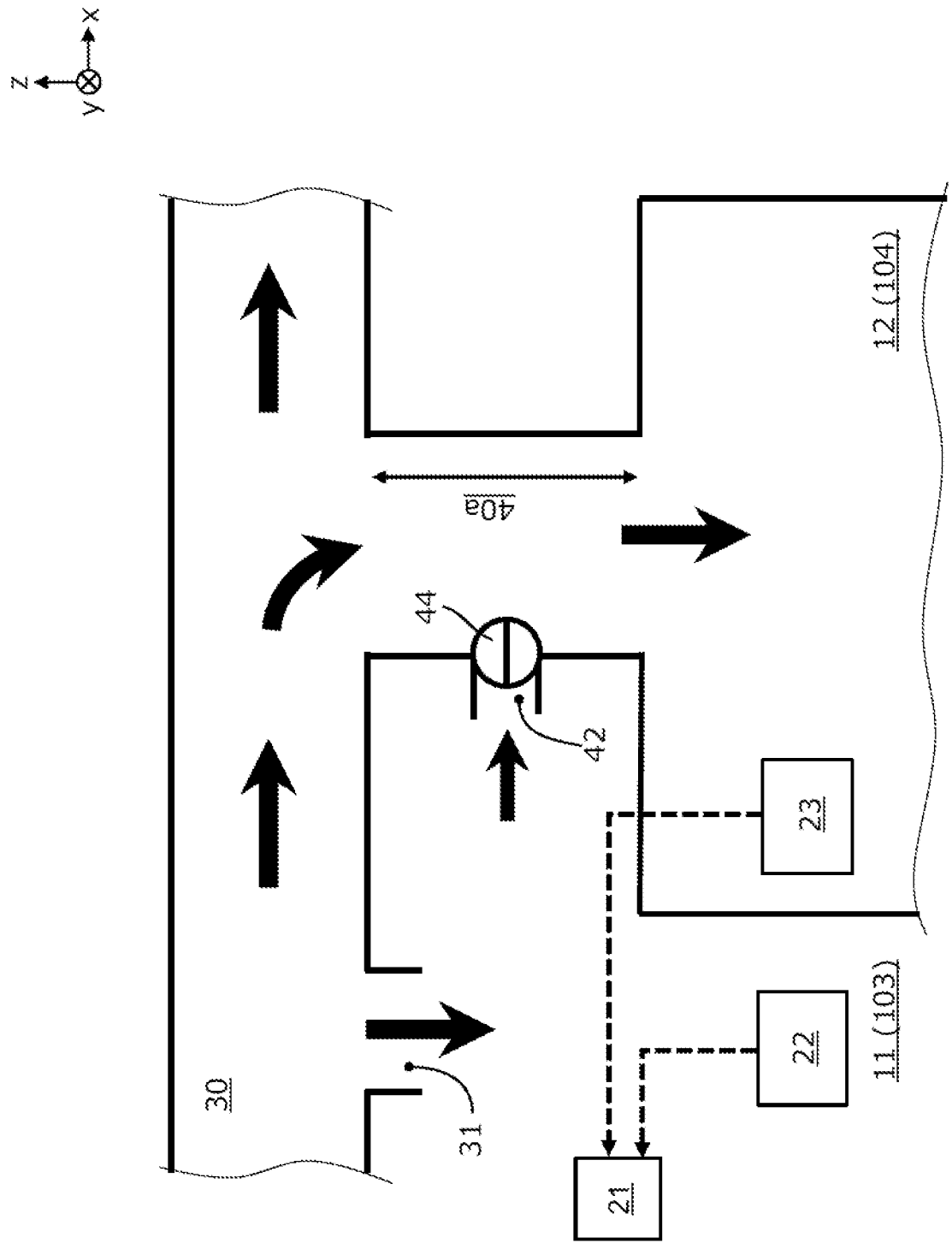
FIG. 9 is a schematic view for showing another branch duct connecting the main duct to the private room.

Next, a fourth embodiment will be described. FIG. 7 is an air system diagram of a railroad vehicle including an exhaust fan for exhausting the air inside the vehicle to the outside of the vehicle in the structure, and FIG. 8 is an air system diagram of a railroad vehicle including an exhaust fan for exhausting the air of a private room to a guest room in the private room. FIG. 9 shows another branch duct connecting a main duct to a private room.

The description of the common parts with the first embodiment to the third embodiment will be omitted, and the configuration and the like characterizing the fourth embodiment will be mainly described. As shown in FIG. 3, the first embodiment to the third embodiment are examples on the assumption that the static pressure 104 of the private room 12 is higher than the static pressure 103 of the guest room 11. On the contrary, the fourth embodiment is an example in which the static pressure of the private room 12 is maintained lower than the static pressure of the guest room 11 to guide the air of the guest room 11 to the private room 12.

There is a plurality of kinds of examples (methods) in which the static pressure 104 of the private room 12 is maintained lower than the static pressure 103 of the guest room 11. As an example, as shown in FIG. 7, there is an example including a private room duct 50 for communicating a section (in the case of FIG. 7, for example, the entrance platform 13) in which the static pressure of exhausting the air in the vehicle by an exhaust device 25 provided in the railroad vehicle 10 and the private room 12. As another example, as shown in FIG. 8, a private room exhaust device 26 is provided in a manner communicating the private room 12 to the guest room 11. However, the present invention is not limited to the above examples.

FIG. 9 is an example of a branch duct 40a connecting the main duct 30 used in the railroad vehicle of the fourth embodiment shown in FIG. 7 or FIG. 8 and the private room 12. Since the static pressure 104 of the private room 12 is maintained lower than the static pressure 103 of the guest room 11 by the exhaust device 25 or the private room exhaust device 26, the air of the guest room 11 flows from the guest room air introduction port 42 into the branch duct 40a and then is naturally supplied to the private room 12.

For this reason, the branch duct 40a shown in FIG. 9 is not provided with the decompression device 43 (see FIG. 2) included in the branch duct 40 of the first embodiment to the third embodiment. With this configuration, since the velocity of the conditioned air flowing in the branch duct 40a is not increased by being contracted by the decompression device 43, the fluid noise accompanying the increase in velocity can be suppressed.

The branch duct 40a includes the introduced air amount adjusting damper 44 at the guest room air introduction port 42. The introduced air amount adjusting damper 44 is opened and closed in accordance with the temperature difference between the private room 12 and the guest room 11 by the control device 21 to which the temperature sensor 23 provided in the private room 12 and the temperature sensor 22 provided in the guest room 11 are connected. Therefore, an increase in the difference between the temperature of the private room 12 and the temperature of the guest room 11 can be suppressed. Therefore, in the railroad vehicle including the private room and the guest room, it is possible to provide the railroad vehicle capable of controlling the private room temperature and the guest room temperature with a simple configuration without increasing the number of manufacturing steps and without requiring complicated control.

Additional Embodiment

Figure 10:
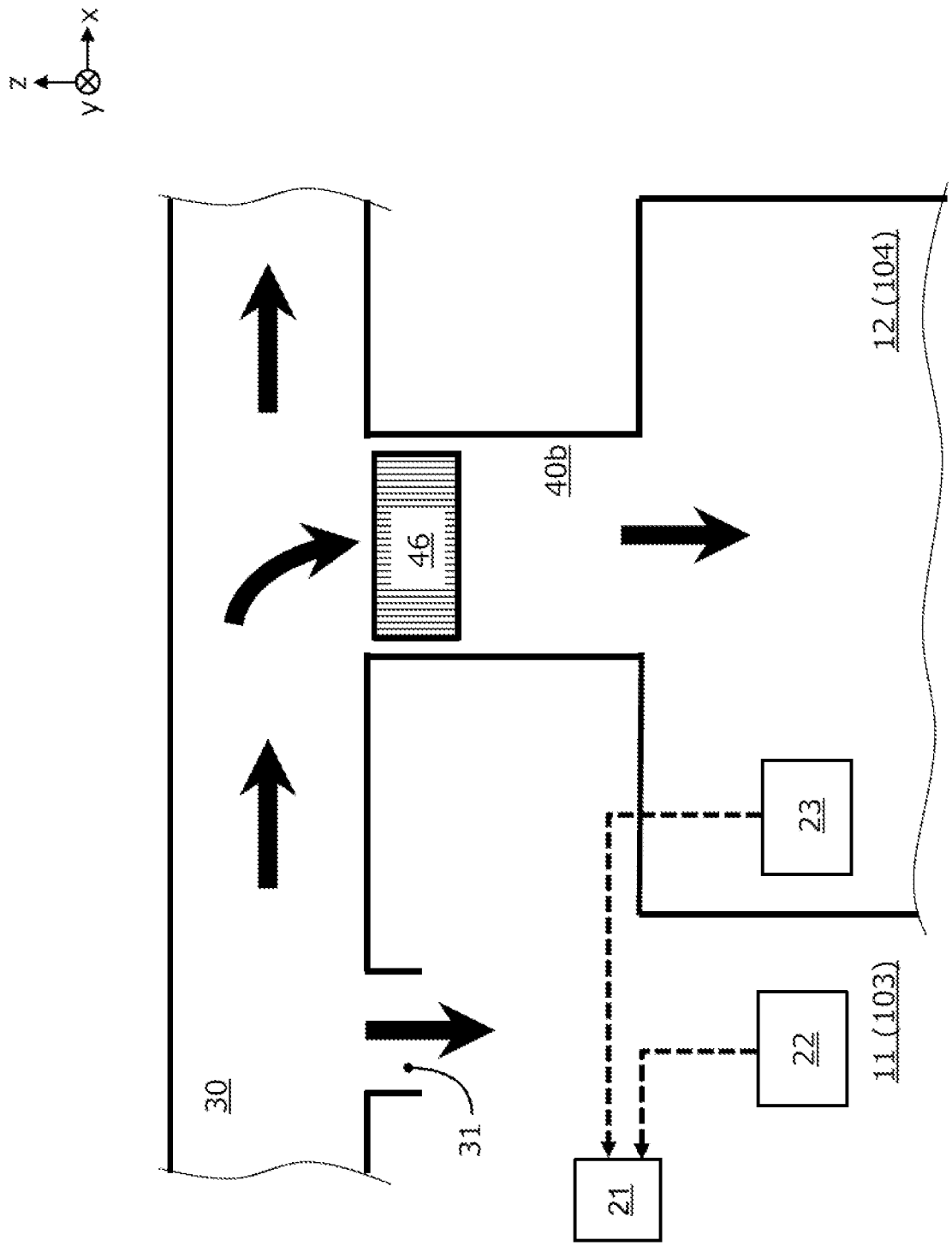
FIG. 10 is a schematic view for showing the branch duct including a heater for heating conditioned air.

Next, an additional embodiment will be described. The embodiment can be combined with the first to fourth embodiments. FIG. 10 shows a branch duct including a heater for heating the conditioned air. Among the heat loads of an air conditioner in winter, the human load generated by passengers includes sensible heat and latent heat, and thus becomes a large heat load as compared to other heat transfer loads and solar radiation loads including only sensible heat. Therefore, when a large number of passengers get on the guest room 11 and a small number of passengers get on the private room 12 in winter, the temperature of the private room 12 may be low even if the guest room 11 is maintained at a comfortable temperature.

As shown in FIG. 10, if a branch duct 40b is provided with a heater 46, when the control device 21 detects the temperature sensor 23 of the private room 12 and the temperature sensor 22 of the guest room 11 and determines that it is necessary to heat the conditioned air supplied to the private room 12, the temperature environment of the private room 12 can be more comfortably maintained by controlling the heater 46 to heat.

It should be noted that the example in which the air conditioner 20 is mounted on the roof of the railroad vehicle 10 and the main duct 30 is arranged at the ceiling of the railroad vehicle 10 has been described in the above-described embodiments. The present invention is not limited to the above-described example, and the air conditioner 20 may be provided under the floor of the railroad vehicle 10 and the main duct 30 may be provided in the floor (immediately below the upper floor) of the railroad vehicle 10.

With the above configuration, in the railroad vehicle including the private room and the guest room, it is possible to provide the railroad vehicle capable of controlling the private room temperature and the guest room temperature with a simple configuration without increasing the number of manufacturing steps and without requiring complicated control.

It should be noted that the present invention is not limited to the above-described embodiments, and includes various modified examples other than the above-described embodiments. For example, the embodiments have been described in detail to easily understand the present invention, and the present invention is not necessarily limited to those including all the configurations described above. In addition, some configurations of an embodiment can be replaced by a configuration of another embodiment, and a configuration of an embodiment can be added to a configuration of another embodiment. In addition, some configurations of each embodiment can be added to, deleted from, and replaced by other configurations.

LIST OF REFERENCE SIGNS x longitudinal (rail) direction
y width (sleeper) direction
z height direction
10 railroad vehicle
11 guest room
12 private room
13 entrance platform
20 air conditioner
21 control device
22 temperature sensor of guest room
23 temperature sensor of private room
24 circulation fan
25 exhaust device
26 private room exhaust device
30 main duct
31 guest room blow-off port
40, 40a branch duct
41 private room blow-off port
42a inlet of guest room air introduction port
42b outlet of guest room air introduction port
43 decompression device
44 introduced air amount adjusting damper
45 conditioned air amount adjusting damper
46 heater
50 private room duct
100 static pressure of branch duct inlet
101 static pressure of branch duct intermediate part
102 static pressure of branch duct outlet
103 static pressure of guest room
104 static pressure of private room

The invention claimed is:

1. A railroad vehicle comprising a private room, a guest room, an air conditioner, and a main duct for supplying conditioned air conditioned by the air conditioner to the guest room,
wherein a branch duct for connecting the main duct to the private room is provided in order to supply the conditioned air to the private room,
wherein the branch duct includes an introduced air port for introducing the air of the guest room to the branch duct in accordance with a difference between the pressure in the guest room and the pressure in the branch duct or the private room,
wherein the branch duct includes a decompressor for setting the static pressure of the outlet of the introduced air port to be lower than the static pressure of the guest room, and
wherein in the decompressor, the cross-sectional area of the flow path of the branch duct from the side of the main duct toward the side of the private room is gradually reduced and then gradually enlarged.

2. The railroad vehicle according to claim 1,
wherein the outlet of the introduced air port is located at the minimum part of the cross-sectional area of the branch duct.

3. The railroad vehicle according to claim 1,
wherein exhaust in the private room is provided.

4. A railroad vehicle comprising a private room, a guest room, an air conditioner, and a main duct for supplying conditioned air conditioned by the air conditioner to the guest room,
wherein a branch duct for connecting the main duct to the private room is provided in order to supply the conditioned air to the private room,
wherein the branch duct includes an introduced air port for introducing the air of the guest room to the branch duct in accordance with a difference between the pressure in the guest room and the pressure in the branch duct or the private room,
an introduced air amount adjusting damper arranged in the introduced air port to adjust the amount of air introduced to the private room from the guest room;
a guest room temperature sensor for detecting the temperature of the guest room;
a private room temperature sensor for detecting the temperature of the private room;
a controller that drives and controls the introduced air amount adjusting damper on the basis of the temperature of the guest room detected by the guest room temperature sensor and the temperature of the private room detected by the private room temperature sensor;
wherein a conditioned air amount adjusting damper for adjusting the amount of the conditioned air supplied from the main duct to the private room via the branch duct is provided, and
wherein the controller drives and controls the conditioned air amount adjusting damper together with the introduced air amount adjusting damper on the basis of the temperature of the guest room detected by the guest room temperature sensor and the temperature of the private room detected by the private room temperature sensor.

5. A railroad vehicle comprising a private room, a guest room, an air conditioner, and a main duct for supplying conditioned air conditioned by the air conditioner to the guest room,
wherein a branch duct for connecting the main duct to the private room is provided in order to supply the conditioned air to the private room,
wherein the branch duct includes an introduced air port for introducing the air of the guest room to the branch duct in accordance with a difference between the pressure in the guest room and the pressure in the branch duct or the private room,
an introduced air amount adjusting damper arranged in the introduced air port to adjust the amount of air introduced to the private room from the guest room;
a guest room temperature sensor for detecting the temperature of the guest room;
a private room temperature sensor for detecting the temperature of the private room;
a controller that drives and controls the introduced air amount adjusting damper on the basis of the temperature of the guest room detected by the guest room temperature sensor and the temperature of the private room detected by the private room temperature sensor;
wherein a heater arranged in the branch duct is provide, and wherein the controller drives and controls the heater on the basis of the temperature of the guest room detected by the guest room temperature sensor and the temperature of the private room detected by the private room temperature sensor.

* * * * *